United States Patent
Elie et al.

(10) Patent No.: US 10,330,394 B2
(45) Date of Patent: Jun. 25, 2019

(54) HEAT TRANSFER MEDIUMS

(71) Applicant: Ford Global Technologies, LLC, Dearborn, MI (US)

(72) Inventors: Larry Dean Elie, Ypsilanti, MI (US); Allan Roy Gale, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/625,301

(22) Filed: Jun. 16, 2017

(65) Prior Publication Data

US 2018/0363989 A1 Dec. 20, 2018

(51) Int. Cl.
| | |
|---|---|
| G05D 15/00 | (2006.01) |
| G05D 16/00 | (2006.01) |
| G05D 23/00 | (2006.01) |
| F28D 20/02 | (2006.01) |
| F28D 15/02 | (2006.01) |
| F28F 23/02 | (2006.01) |
| C09K 5/00 | (2006.01) |
| F28F 23/00 | (2006.01) |
| F28D 21/00 | (2006.01) |

(52) U.S. Cl.
CPC .............. F28D 20/023 (2013.01); C09K 5/00 (2013.01); F28D 15/02 (2013.01); F28D 20/026 (2013.01); F28F 23/00 (2013.01); F28F 23/02 (2013.01); *F28D 2015/0225* (2013.01); *F28D 2021/008* (2013.01)

(58) Field of Classification Search
CPC ....... C09K 5/063; F28D 15/02; F28D 20/023; F28D 20/026; F28F 23/02
USPC ........................................................ 165/279
See application file for complete search history.

(56) References Cited

U.S. PATENT DOCUMENTS

| | | |
|---|---|---|
| 9,016,090 B2 | 4/2015 | Hojaji et al. |
| 9,080,796 B2 | 7/2015 | Shaikh et al. |
| 2013/0056193 A1* | 3/2013 | Thiers .................... C09K 5/063 165/185 |
| 2013/0344337 A1 | 12/2013 | Qi et al. |

(Continued)

FOREIGN PATENT DOCUMENTS

| | | |
|---|---|---|
| CN | 103285793 A | 9/2013 |
| CN | 103752239 A | 4/2014 |
| WO | 8000438 A1 | 3/1980 |

OTHER PUBLICATIONS

D. Attinger, et al., Surface Engineering for Phase Change Heat Transfer: A Review, https://researchgate.net/profile/Chang-Jin_Kim2/publication/265852539_Surface_Engineerig_for_Phase_Change_Heat_Transfer_A_Review/links/54d103c20cf25ba0f0409944.pdf, Sep. 2014, 85 pgs.

(Continued)

*Primary Examiner* — Davis D Hwu
(74) *Attorney, Agent, or Firm* — Julia Voutyras; Brooks Kushman P.C.

(57) ABSTRACT

The disclosure generally relates to compositions, methods, and systems for heat transfer and methods of preparing heat transfer mediums. In various embodiments are described heat transfer mediums comprising a plurality of microparticles suspended in a bulk material with each microparticle containing a phase change material. In other embodiments are described fluids comprising of a slurry of microparticles containing phase change fluid in a carrier liquid for a fast charger system.

14 Claims, 11 Drawing Sheets

(56) References Cited

U.S. PATENT DOCUMENTS

2015/0143818 A1* 5/2015 Eckhoff .................. F28D 15/02
62/3.2
2017/0058175 A1 3/2017 Gasworth

OTHER PUBLICATIONS

Nadler, J. H., Thomas H. Sanders, Jr., and Joe K. Cochran, Aluminum Hollow Sphere Processing, Materials Science Forum, vol. 331, Trans Tech Publications, 2000, 6 pgs.

* cited by examiner

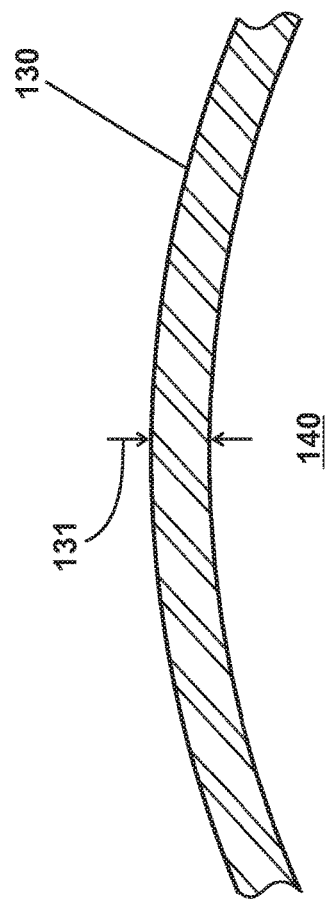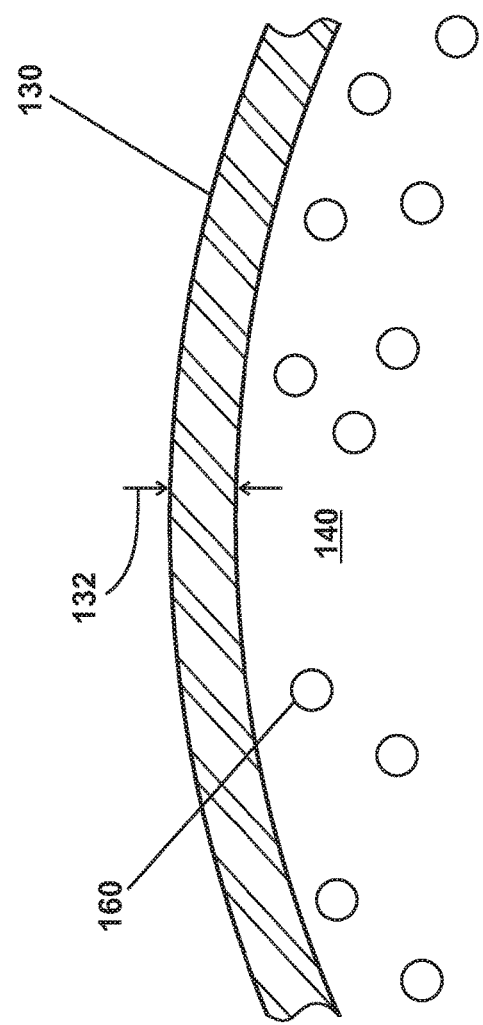

HEAT TRANSFER MEDIUMS

TECHNICAL FIELD

The disclosure generally relates to compositions, methods, and systems for heat transfer and methods of preparing heat transfer mediums.

BACKGROUND

Heat transfer fluids are commonly used in a mechanical system to transfer heat from one part of the system to another. Water based coolants in engines, liquids in heat exchangers for electrical circuits, or even most air conditioners are examples heat transfer fluids. The most efficient fluids take advantage of changes in enthalpy, or latent heat of fusion to transfer a significant amount of heat. Heat exchangers often involve a phase change of the heat transfer fluid, usually liquid to gas. Although liquids pump easily and have excellent heat exchange with a surface, gasses do not pump as well nor do they transfer heat to a surface as well. These problems are generally addressed through careful machine design with complex heat exchangers and pressure pumps. These systems are large, bulky and work only with heat exchangers in carefully controlled combinations of pressure and temperature. In some systems, such as an engine cooling system, the system is specifically designed not to have a phase change (e.g. boiling) even though that might be thermodynamically efficient because the boiled water can no longer be pumped efficiently and cannot transfer energy with the radiator (e.g. heat exchanger) efficiently.

SUMMARY

In various embodiments are disclosed heat transfer mediums for transferring heat such as, for example, coolant and antifreeze compositions. The heat transfer mediums of various embodiments comprise a plurality of microparticles such as microspheres suspended within a bulk material. The microparticles of various embodiments include phase change materials that employ the heat or enthalpy of vaporization of the phase change materials for transferring heat. In various embodiments, the heat transfer mediums can be added to/mixed with other types of heat transfer mediums used in various heat transfer systems.

In various embodiments, the heat transfer mediums are a pumpable fluid such as a slurry. The slurry of various embodiments may be a non-settling slurry and can include various types of slurries such as light slurries (microparticles that are less than about 5% by weight of the heat transfer mediums), medium slurries (microparticles that are about 5% to about 20% by weight of the heat transfer mediums), and heavy slurries (microparticles that are greater than about 20% by weight of the heat transfer mediums).

In various embodiments, the bulk material can include various types of materials such as carrier fluids. The bulk material of various embodiments may be a thermal conductive fluid capable absorbing heat and thermally conducting the heat to the microparticles. The bulk material of various embodiments may be capable of absorbing heat from the microparticles and thermally conducting the heat away from the heat transfer medium. The bulk material of various embodiments also has a boiling point temperature ($T_{BP1}$) or does not boil at the temperature of the hottest point in a heat transfer system such as a fluid loop. In various embodiments, $T_{BP1}$ is predetermined for an intended use such as, for example, a heat transfer system with parameters (e.g. temperatures, pressures, etc.) that correlate with $T_{BP1}$.

In various embodiments, the heat transfer system of various embodiments can apply a pressure ($P_{Outside}$) to the bulk material.

In various embodiments, the plurality of microparticles are at least about 0.1 percent by weight of the heat transfer medium. Each microparticle of various embodiments comprises a shell enclosing a cavity, where the cavity includes a phase change material (PCM). The heat transfer mediums of various embodiments have a heat capacity that is greater than an otherwise identical heat transfer medium devoid of microparticles. The heat transfer mediums of various embodiments also have a heat transfer efficiency that is greater an otherwise identical heat transfer medium devoid of microparticles.

In various embodiments, each microparticle is micron sized or has a particle size or diameter that is at most about 1,000 μm. The plurality of microparticles of various embodiments are micron sized or have a mean particle size or mean diameter that is at most about 1,000 μm.

In various embodiments, the plurality of microparticles are microspheres. In various embodiments, the plurality of microparticles have densities effective for suspension in the bulk material. In various embodiments, the plurality of microparticles have densities about equal to a density of the bulk material.

In various embodiments, the cavity has an internal pressure ($P_{Internal}$) independent of pressure outside the shell or the microparticle(s). $P_{Internal}$ of various embodiments is predetermined for an intended use such as, for example, a heat transfer system with parameters (e.g. temperatures, pressures, etc.) that correlate with $P_{Internal}$. In various embodiments, $P_{Internal}$ is different from $P_{Outside}$ of the bulk material and/or is less than or greater than 1.01325 Bar.

In various embodiments, the shell has a tensile strength, percent elongation, Young's modulus, or thickness sufficient to maintain $P_{Internal}$ independence from pressure outside of the shell or the microparticle(s) and/or for use in various heat exchange systems such as, for example, vehicular coolant or heating systems. The shell of various embodiments can also be non-porous or allow for diffusion of gasses at various diffusion rates. The shell of various embodiments has a tensile strength or Young's Modulus of at least of 10 megapascals (MPa) or 1450.38 pounds per square inch (psi), a percent elongation of at least 0.1, and/or an isostatic crush strength of at least about 5,000 psi.

In various embodiments, the shell is thermally conductive and can conduct heat to the cavity and contents within the cavity such as the PCM as well as absorbing heat from the cavity and contents (e.g. PCM) within the cavity. The shell of various embodiments is also capable of absorbing heat from the bulk material and conducting heat to the bulk material. The shell of various embodiments can comprise various materials including, for example, glasses, polymers, and metals.

In various embodiments, the shell has a volume ($V_{Shell}$), the cavity has a volume ($V_{Cavity}$), and each cavity of the plurality of microparticles have a $V_{Cavity}$:$V_{Shell}$ ratio ranging from about 3:1 to about 200:1. In various embodiments, the microparticles have volumes and the shells are about 0.5% to about 25% of the volumes of the microparticles. The cavities of various embodiments are about 75% to about 99.5% of the volumes of the microparticles.

The cavity of various embodiments contains a PCM. In various embodiments, the cavity can be hollow except for the PCM and can be defined by the shell.

The PCM of various embodiments has a boiling point temperature or gas/liquid transition temperature ($T_{BP2}$) or a $T_{BP2}$ at $P_{Internal}$. The PCM of various embodiments is a gas or in a gaseous phase at or greater than $T_{BP2}$ or $T_{BP2}$ at $P_{Internal}$ and a liquid or in a liquid phase at less than $T_{BP2}$ or $T_{BP2}$ at $P_{Internal}$. In various embodiments, $T_{BP1}$ of the bulk material is greater than the $T_{BP2}$ or $T_{BP2}$ at $P_{Internal}$ of the PCM. In various embodiments, $T_{BP2}$ is predetermined for an intended use such as, for example, a heat transfer system with parameters (e.g. temperatures, pressures, etc.) that correlate with $T_{BP2}$.

In various embodiments, the PCM has a vapor pressure at least similar to and/or greater than the vapor pressure of water at any temperature such as, for example, about 0.03169 Bar at about 25° C. (77° F.).

In various embodiments, the vapor pressure of the PCM is at least 0.03169 Bar at about 25° C. (77° F.).

In various embodiments, the bulk material has a melting temperature or a solid/liquid transition temperature ($T_{MP1}$) that is less than a melting temperature or a solid/liquid transition temperature ($T_{MP2}$) or $T_{MP2}$ at $P_{Internal}$ of the PCM. The PCM of various embodiments is a solid or in a solid phase below $T_{MP2}$ or $T_{MP2}$ at $P_{Internal}$ and a liquid or in a liquid phase at or above $T_{MP2}$ or $T_{MP2}$ at $P_{Internal}$.

In various embodiments, $T_{MP1}$ and/or $T_{MP2}$ are predetermined for an intended use such as, for example, a heat transfer system with parameters (i.e. temperatures, pressures, etc.) that correlate with $T_{MP1}$ and/or $T_{MP2}$.

Alternatively, the cavity of various embodiments may contain a second PCM with a melting temperature or a solid/liquid transition temperature ($T_{MP3}$) or $T_{MP3}$ at $P_{Internal}$ that is less than $T_{MP1}$ of the bulk material. In various embodiments, $T_{MP3}$ is predetermined for an intended use such as, for example, a heat transfer system with parameters (i.e. temperatures, pressures, etc.) that correlate with $T_{MP3}$.

In various embodiments, the liquid PCM or solid PCM is about 0.1 percent to about 50 percent of $V_{Cavity}$ of the cavity.

In various embodiments, the shell has a density ($D_{Shell}$) and the $D_{Shell}$ when the PCM is gas is less than $D_{Shell}$ when the PCM is liquid. In various embodiments, $V_{Cavity}$ of the cavity when the PCM is gas is greater than $V_{Cavity}$ of the cavity when the PCM is liquid.

In various embodiments, the plurality of microparticles have densities ($D_{Gas}$) when the PCM is a gas that is less than densities ($D_{Liquid}$) of the plurality of microparticles when the PCM is a liquid. In various embodiments, transitioning between $D_{Gas}$ and $D_{Liquid}$ causes the plurality of microparticles to move through the bulk material. In one embodiment, transitioning from $D_{Liquid}$ to $D_{Gas}$ causes at least a portion the plurality of microparticles to rise through the bulk material. In another embodiment, transitioning from $D_{Gas}$ to $D_{Liquid}$ causes at least a portion the plurality of microparticles to fall or sink through the bulk material.

In various embodiments, $P_{Internal}$ in the cavity is greater when the PCM is a gas than when the PCM is a liquid or solid. The increase in $P_{Internal}$ of various embodiments can cause an increase in the particles size in at least a portion of the plurality of microparticles. In various embodiments, the plurality of microparticles have mean particle sizes or mean diameters ($MD_{Gas}$) when the PCM is a gas that are greater than mean particles sizes or mean diameters ($MD_{Liquid}$) of the plurality of microparticles when the PCM is a liquid.

In various embodiments are disclosed heat transfer systems comprising: a plurality of microparticles within a bulk material, where each microparticle has a shell enclosing a cavity having a pressure ($P_{Internal}$) independent of pressure outside the shell and including a PCM having a boiling point temperature ($T_{BP}$) at $P_{Internal}$; and first ($HE_1$) and second ($HE_2$) heat exchangers thermally connected to the plurality of microparticles; wherein $HE_1$ is configured to heat the plurality of microparticles to at least $T_{BP}$ at $P_{Internal}$ to cause the microparticles to rise within the bulk material; wherein $HE_2$ is configured to cool the plurality of microparticles to below $T_{BP}$ at $P_{Internal}$ to cause the microparticles to fall within the bulk material. $HE_2$ of various embodiments could be positioned at a height above $HE_1$ of various embodiments such that the heat transfer system further includes $HE_1$ heating the microparticles to at least $T_{BP}$ or $T_{BP2}$ at $P_{Internal}$ to cause the microparticles to rise to $HE_2$ and/or $HE_2$ cools the microparticles to below $T_{BP}$ or $T_{BP2}$ at $P_{Internal}$ to cause the microparticles to fall to $HE_1$. In various embodiments, the heat transfer systems include cycling or continually cycling the microparticles within a bulk material such that heat is transferred $HE_1$ to $HE_2$.

In various embodiments are disclosed methods and systems for heat exchange comprising the steps of: providing a heat transfer medium (i.e. a flowable non-settling slurry) comprising a bulk material (i.e. a thermally conductive fluid) having a boiling point temperature and a plurality of microparticles suspended within the bulk material, each microparticle having a cavity surrounded by shells and containing a PCM with a boiling point temperature (e.g. gas/liquid transition temperatures) less than the boiling point temperature of the bulk material; exposing the heat transfer medium to a first surface, where heat is transferred from the first surface to the heat transfer medium such that the PCM in at least a portion of the microparticles transition from a liquid to a gaseous state; flowing the heat transfer medium away from the first surface; and exposing the heat transfer medium to a second surface, where heat is transferred from the heat transfer medium to the second surface such that the PCMs in at least a portion of the microparticles transition from a gaseous to a liquid state. In various embodiments, the methods and systems for heat exchange further include cycling or continually cycling the heat transfer medium between the first and second surfaces.

In various embodiments, the step of exposing the heat transfer medium to the first surface where heat is transferred from the first surface to the heat transfer medium further includes the PCM in at least a portion of the microparticles transitioning from a solid, to a liquid, and then to a gaseous state. In various embodiments, the step of exposing the heat transfer medium to a second surface where heat is transferred from the heat transfer medium to the second surface further includes the PCM in at least a portion of the microparticles transitioning from a gaseous, to a liquid, and then to a solid state.

In various embodiments are disclosed methods of preparing heat transfer mediums including the steps of: forming microparticles with shells enclosing cavities having internal pressures (e.g. $P_{Internal}$) independent of pressures outside the shells or microparticles and containing a PCM having a boiling point temperature or a gas/liquid transition temperature (e.g. $T_{BP2}$) at $P_{Internal}$; and mixing the plurality of microparticles with a bulk material. In various embodiments, the bulk material has a boiling point temperature (e.g. $T_{BP1}$) that is greater than $T_{BP2}$ or $T_{BP2}$ at $P_{Internal}$ of the PCM.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 11 is a fragmented, cross-sectional view of a shell of a microparticle containing a phase change material in a liquid or solid phase of various embodiments.

FIG. 12 is a fragmented, cross-sectional view of a shell of a microparticle containing a phase change material in a gas phase of various embodiments.

DETAILED DESCRIPTION

Figure 1A:
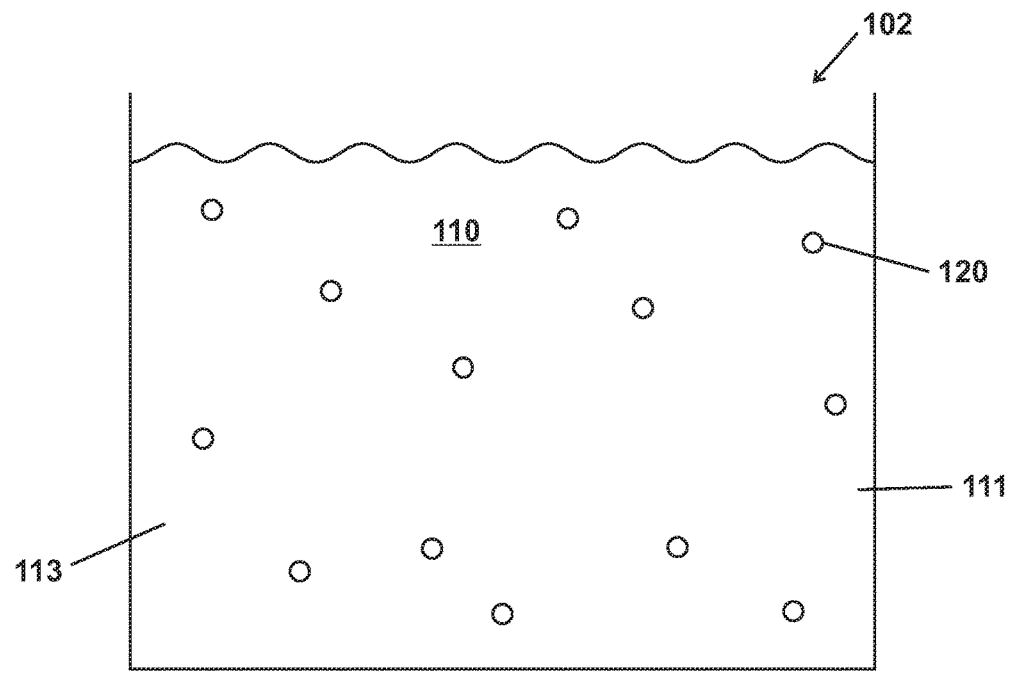
FIGS. 1A, 1B, and 1C are schematic views of heat transfer mediums of various embodiments.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. The first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

Throughout this application, where publications are referenced, the disclosures of these publications in their entireties are hereby incorporated by reference into this application to more fully describe the state of the art to which this invention pertains.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "$T_{BP}$" can be used interchangeably to identify the boiling point temperatures or gas/liquid transition temperatures of any element of the compositions including, for example, the bulk material(s) and phase change material(s) of any embodiment.

The term "$T_{MP}$" can be used interchangeably to identify the melting point temperatures or liquid/solid transition temperatures of any element of the compositions including, for example, the bulk material(s) and phase change material(s) of any embodiment.

The disclosure generally relates to compositions, methods, and systems for heat transfer and methods of preparing compositions for heat transfer. In various embodiments are described heat transfer mediums 100,101,102 comprising microparticles 120 containing a phase change material 150, 160,170 and suspended in a bulk material 110. In other embodiments are described fluids comprising of a slurry of microspheres containing phase change fluid in a carrier liquid for a fast charger system. The heat transfer mediums 100,101,102 of various embodiments can be pumpable and transfers energy well from differing heat exchangers such that heat transfer mediums 100,101,102 can be used as replacements for coolants, antifreeze, and/or heat exchange fluids used in, for example, heat pumps, heating ventilation and air conditioning (HVAC) systems, vehicular cooling/heating systems, or any heat transfer system without requiring large pressure differences to create a phase change. In various embodiments, the heat transfer mediums 100,101, 102 are electrically non-conductive and/or have a low cost to manufacture or prepare. Further, the heat transfer mediums 100,101,102 of various embodiments are customizable for use in different applications and systems have varying parameters such temperature.

Figure 1B:
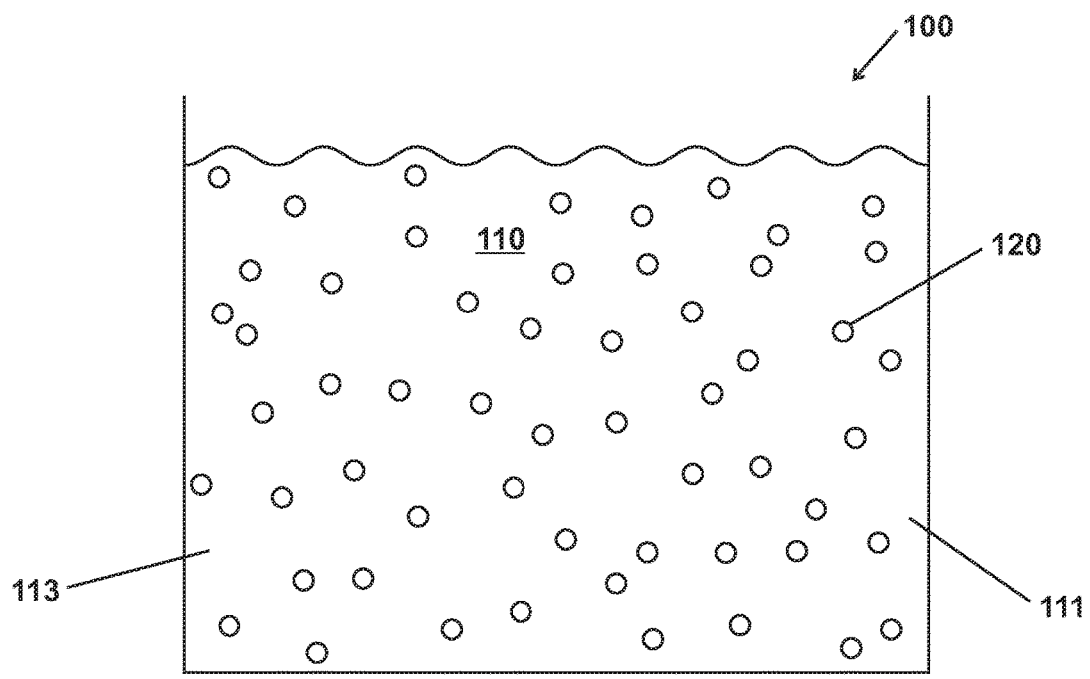
Figure 1C:
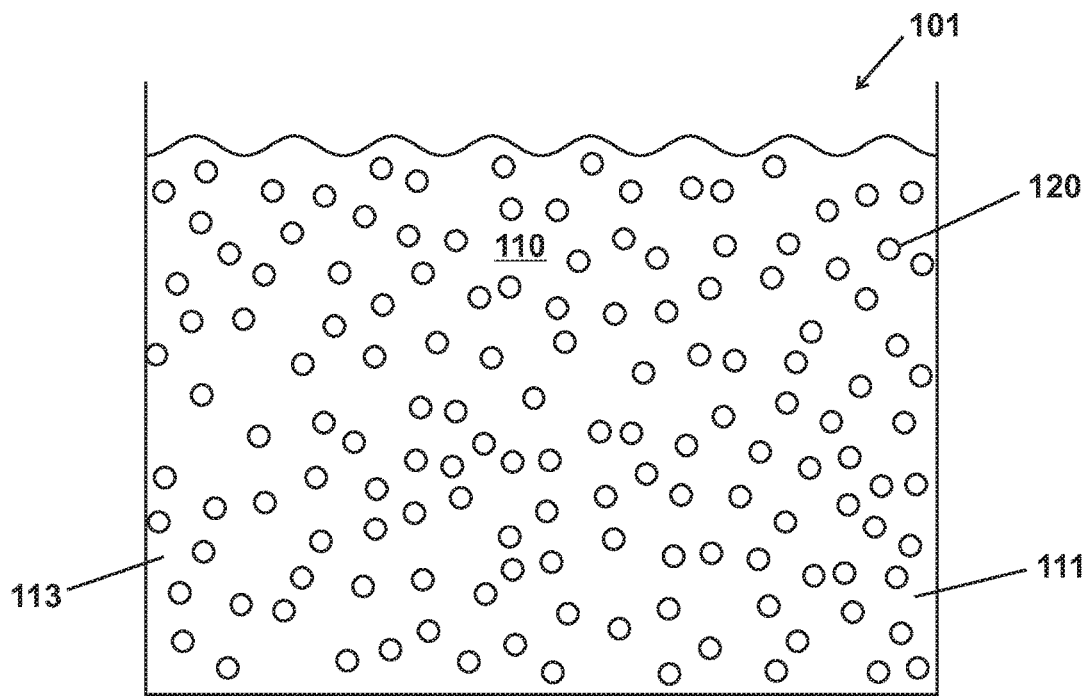

FIGS. 1A, 1B, and 1C are schematic views of heat transfer mediums 100,101,102 of various embodiments containing various quantities of microparticles 120 suspended in a bulk material 110. In various embodiments, the microparticles 120 of various embodiments are 0.1, 1, 5, 10, 15, 20, 25, 50, 75, 90, 95, or 99.5 percent by weight (wt. %) of the heat transfer medium 100,101,102. In various embodiments, the percent by weight of the microparticles 120 is a range between any two of the weight percents of the heat transfer medium 100,101,102 listed above. Further, a larger wt. % or percent by volume of the microparticles 120 allows for movement of a greater amount of heat per time. This is also known as q-dot, the time rate of change of heat transfer.

As shown in FIGS. 1A-1C and 2, the bulk material 110 can include various types of materials such as carrier fluids. The bulk material 110 of various embodiments can be a thermally conductive fluid capable absorbing heat and can thermally conduct the heat to the microparticles 120. The bulk material 110 of various embodiments can also be capable of absorbing heat from the microparticles 120 and can thermally conduct the heat away from the heat transfer medium 100,101,102. Examples of the bulk material 110 include various types of fluids and oils such as silicone oil, transmission oils, hydraulic oils, glycols, water, and combinations thereof. The bulk material 110 of various embodiments also has a boiling point temperature ($T_{BP1}$) or does not boil at the temperature of the hottest point in a heat transfer system such as a fluid loop. In various embodiments, $T_{BP1}$ is predetermined for an intended use such as, for example, a heat transfer system with parameters (e.g. temperatures, pressures, etc.) that correlate with $T_{BP1}$. In other embodiments, the bulk material has a melting point temperature ($T_{MP1}$)

Figure 17:
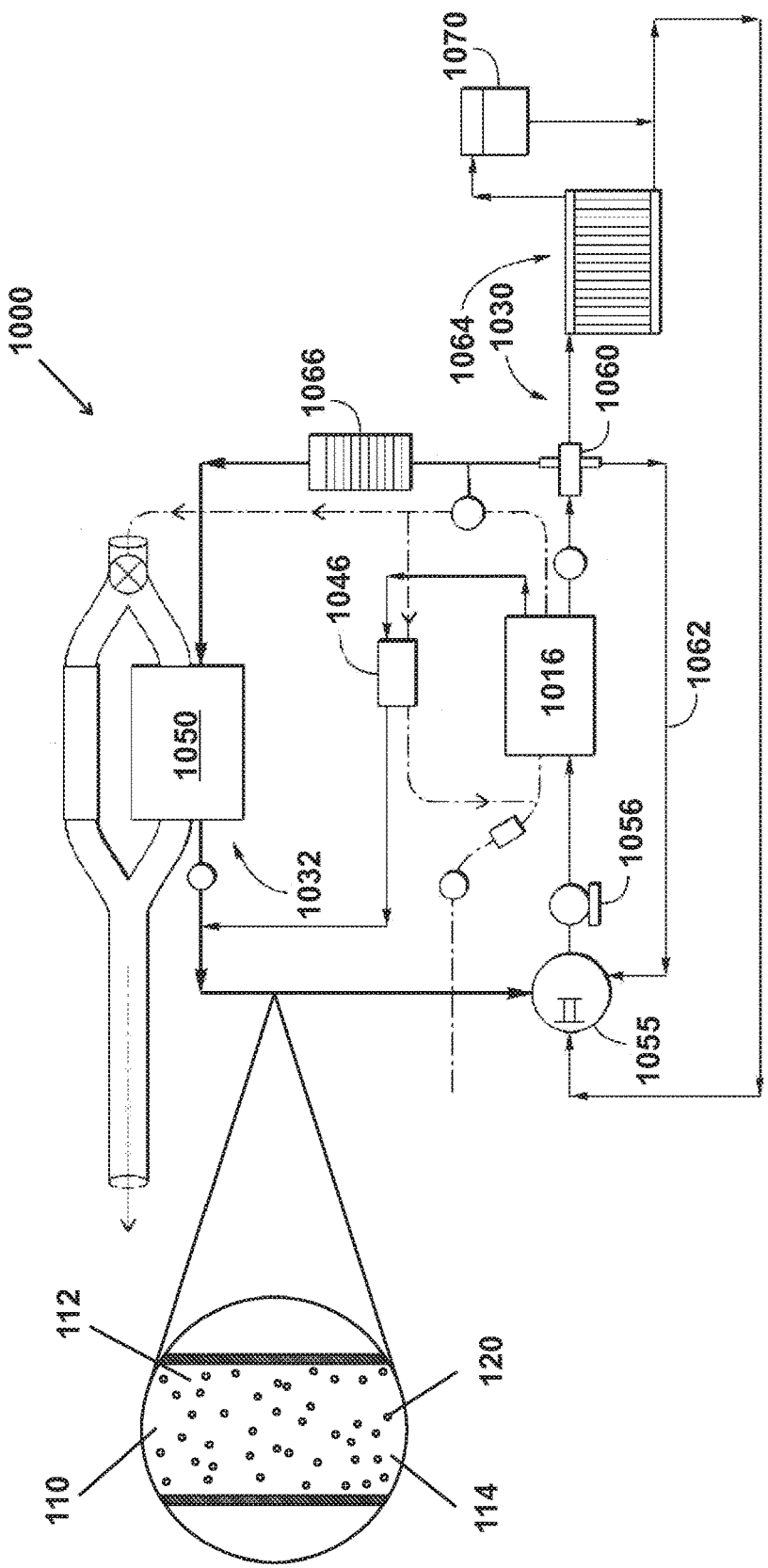
FIG. 17 is a schematic view showing a heat transfer medium of various embodiments as shown in FIG. 2 flowing through an example heat transfer system.

In various embodiments, the heat transfer system of various embodiments such as a heat transfer system 1000 as shown in FIG. 17 can apply a pressure ($P_{Outside}$) 111,112 to the bulk material 110.

As shown in FIGS. 3-6, the microparticles 120 of various embodiments are made up of a shell 130 enclosing a cavity 140 including a phase change material (PCM) as a liquid 150, as a gas 160, and as a solid 170.

The preparation of the microparticles 120 of various embodiments can be prepared in a number of ways such as, for example, methods outlined in U.S. Patent Application Publication No. 2013/0344,337; PCT Patent Application Publication No. WO 08/00438; and Nadler, J. H., Thomas H. Sanders Jr, and Joe K. Cochran. "Aluminum hollow sphere processing." Materials science forum. Vol. 331. Trans Tech Publications, 2000, which are all incorporated by reference.

The microparticles 120 of various embodiment could also be prepared, for example, by dropping molten materials in a drop chamber, where the molten materials solidify as they fall. An ultrasonic nozzle could be used, for example, to create droplets of the molten materials. As the molten materials solidifies, a cavity 140 forms to include gas in the drop chamber being that is entrapped during the fall. In various embodiments, the quantity of gas containing a PCM 160 in the chamber is controlled by the gas pressure in the chamber at the time the microparticles 120 or microspheres solidify such that the amount of gas containing the PCM 160 in the cavity 140, and can be controlled. With the microparticles 120 being filled in a drop chamber and solidifying at a pressure that can be lower (or higher) than atmospheric, one can control pressure of the (example; water vapor) sealed in the sphere, and therefore the temperature at which boiling takes place inside the microparticles 120. Further in varying embodiments, the quantity of gas containing the PCM 160 in the microparticles 120 can be chosen to undergo a phase change at most typical mechanical process temperatures, and can be controlled to a few percent. In various embodiments, using gas/liquid phase change allows for customization of the temperature at which the phase change takes place by controlling the mass of material sealed in the microparticle at the time of manufacture. Also, the thickness 131,132 of the shell 130 can be controlled to a few percent and materials can be selected for the shell 130 that are good thermal conductors of heat or heat transfer materials. Further, the microparticles 120 are made to not settle out from the bulk material 110.

Methods of preparing heat transfer mediums of various embodiments further include mixing the plurality of microparticles 120 with a bulk material 110.

Figure 7:
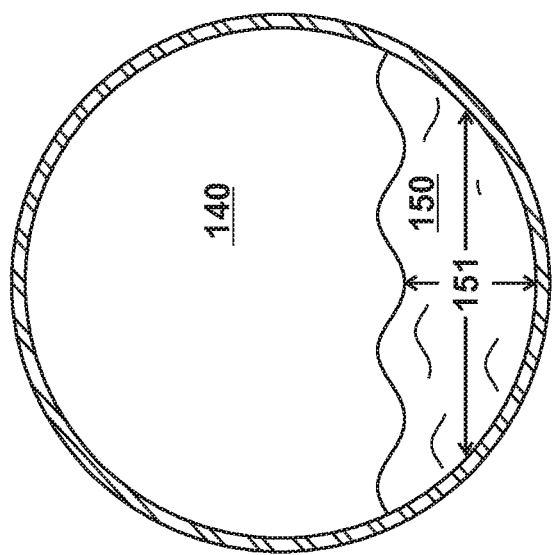
Figure 9:
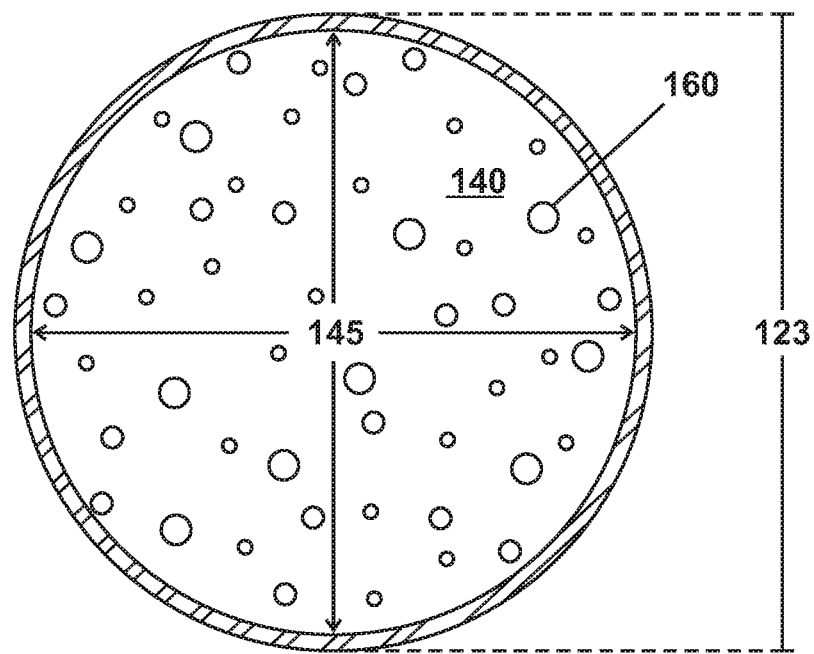

As shown in FIGS. 7 and 9, the microparticles 120 of various embodiments can be microspheres (e.g. has a spherical shape) having a particle size or diameter 122,123. In various embodiments, the particles sizes or diameters 122, 123 are greater than about 0.1 microns and/or equal to or less than 1000 microns. In various embodiments, the particles sizes or diameters 122,123 are 0.1, 0.5, 1, 5, 10, 15, 20, 25, 100, 200, 300, 400, 500, 600, 700, 800, 900, or 1000 microns. In various embodiments, the particles sizes or diameters 122,123 range between any two particle sizes or diameters listed above. In various embodiments, the plurality of microparticles 120 have a mean diameter or mean particle size ranging between any two particle sizes or diameters listed above. In various embodiments, the plurality of microparticles 120 includes microparticles with varying particles sizes or diameters 122,123 or microparticles with generally uniform particles sizes or diameters 122,123.

For example, the shell 130 and cavity 140 of the microparticles 120 can be similar to H50/10,000 EPX and S60/10,000 borosilicate glass spheres from 3M and can be formulated to contain a PCM 150,160,170.

The microparticles 120 of various embodiments also have densities 121,124 based on composition of the bulk material 110 and microparticles 120 that can be controlled in the production of the microparticles for buoyancy in the bulk material 110. In various embodiments, the microparticles 120 have densities 121,124,127 effective for suspension in the bulk material 110 such that the microparticles 120 can remain suspended in the bulk material 110 for an extended amount of time and the heat transfer medium 100,101,102 can be a non-settling slurry. In various embodiments, the microparticles 120 have densities 121,124,127 about equal to a density 113,114 of the bulk material 110. In various embodiments, the microparticles 120 have densities ($D_{Gas}$) 124 when the PCM 160 is a gas that is different than densities ($D_{Liquid}$) 121 of the plurality of microparticles when the PCM is a liquid 150. In other embodiments, $D_{Gas}$ 124 is less than $D_{Liquid}$ 121. Also, the microparticles of various embodiments 120 have densities ($D_{Solid}$) 127 when the PCM is a solid 170 that are different from or greater than $D_{Gas}$ 124.

Figure 6:
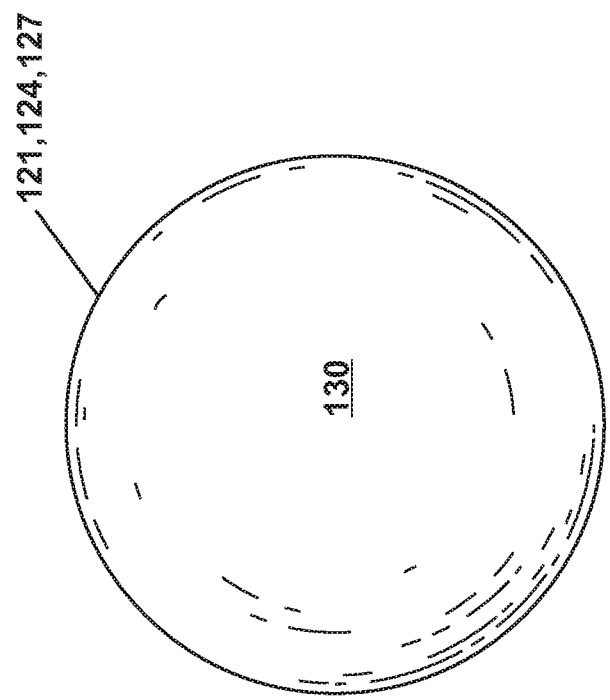
FIG. 6 is a perspective view of a shell of a microparticle of various embodiments.

As shown in FIG. 6, the microparticles of various embodiments include a shell 130. The shell 130 of various embodiments is thermally conductive and can conduct heat to and away from the cavity 140 and the contents within the cavity such as a PCM 150,160, 170 as well as absorbing heat from the cavity 140 and contents (i.e. PCM 150,160, 170) within the cavity 140. The shell 130 of various embodiments is also capable of absorbing heat from the bulk material 110 and conducting heat to and away from the bulk material 110. The shell 130 of various embodiments can comprise various materials including, for example, various types of glasses, various types of polymers, various types of ceramics, various types of metals, and combinations thereof. Example materials for the shell 130 of various embodiments include borosilicate glass, iron, steel, aluminum, brass, polyethylene, and aluminum nitride.

As shown in FIGS. 3-10, the shell 130 of various embodiments encloses a cavity 140 having internal pressures 141, 142,143. The cavity 140 of various embodiments can be hollow except for the PCM 150,160,170 and can be defined by the shell 130. The internal pressures 141,142,143 or $P_{Internal}$ can be independent of pressure outside the shell 130 or the microparticle 120. Further, the microparticle 120 can be formulated to have a $P_{Internal}$ 141,142,143 to control the $T_{BP2}$ 180 of the PCM such that the PCM transitions from a liquid 150 to a gas 160 at the $T_{BP2}$ 180 at $P_{Internal}$ 141,142 as show in FIG. 13. For example, water at atmospheric pressure (1.01325 Bar) boils at 100° C. The $P_{Internal}$ 141,142 of various embodiments can be, for example, 0.5 Bar, 2 Bar, or 10 Bar and water as a PCM 150,160 in the cavity would have a $T_{BP2}$ 180 of 70° C., 120° C., or 170° C.

In various embodiments, the shell 130 has a tensile strength, percent elongation, Young's modulus, or thickness sufficient to maintain $P_{Internal}$ 141,142,143 independence from pressure outside of the shell 130 or the microparticle 120. Further, the shell 130 of various embodiments also has characteristics such as, for example, tensile strength, percent elongation, Young's modulus, or thickness for use in various heat exchange systems such as cooling/heating systems for vehicles (e.g. resistant to breakage, etc.). For example, the shell 130 of various embodiments can have a tensile strength or a Young's modulus of at least about 10 MPa (1450.38 psi) and/or a percent elongation of at least about 0.1. The shell 130 of various embodiments can also be, water proof, substantially non-porous or have a surface area (i.e. less than 100 m²/g) effective to prevent diffusion of contents of the cavity 140 as determined by Brunauer-Emmett-Teller analysis or ISO 9277, or allows for diffusion of gasses through the shells at various diffusion rates. The diffusion rate of gasses of various embodiments can be 1% or less of the total volume of gaseous PCM 160. In various embodiments, the shells have an isostatic crush strength of at least about 5,000 psi (3.45 MPa).

As shown in FIGS. 7 and 9, the cavity 140 has a volume ($V_{Cavity}$) 144,145. FIGS. 11 and 12 show the shell 130 having a volume ($V_{Shell}$) and density ($D_{Shell}$) that is relative to the thickness and/or diameter 131,132 of the shell 130.

The microparticles 120 of various embodiments have a $V_{Cavity}$:$V_{Shell}$ ratio of about 3/1, 10/1, 50/1, 75/1, 90/1, 100/1, 110/1, 120/1, 130/1, 140/1, 150/1, 160/1, 170/1, 180/1, 190/1, or 200/1. In various embodiments, the $V_{Cavity}$:$V_{Shell}$ ratio is a range between any two $V_{Cavity}$:$V_{Shell}$ ratios from above.

In various embodiments, the microparticles 120 have volumes and the shells 130 are about 0.5%, 1%, 5%, 10%, 15%, 20%, or 25% of the volumes of the microparticles 120. In various embodiments, the shells 130 are between any two percentages of the volumes of the microparticles 120 from above.

The cavities 140 are about 75%, 80%, 85%, 90%, 95%, 99%, or 99.5% of the volumes of the microparticles 120. In various embodiments, the cavities 140 are between any two percentages of the volumes of the microparticles 120 from above.

The following is an example highlighting the relationship of the densities 121,124 of microparticles 124 as compared to the density 113,114 of the bulk material as measured by the mass and volume of the microparticles as understood through the shell 130 and cavity 140. The shape of a gas or air-atomized particle is generally spherical. The mass of the microparticle is of the density of the bulk material times the volume of the particle can be calculated from the diameter or radius of the microparticle (V=4/3 πr³). The mass of the microparticle can include the mass of the PCM. A particle can be manufactured in quantity of size and wall thickness to give a mass of exactly that of the fluid being displaced by the particle. If the bulk material in question has density 1 g/ml and the microparticle 120 desired has a diameter of 10 micrometers, the desired volume is 4/3 π (5 micrometers)³ or 523 cubic micrometers. As the density is 1 g/ml, the mass in this case is 523 µg. Assuming iron or steel, 7.8 g/ml, a shell 130 extending in from radius 5 micrometers can be made such that the mass is 523 µg. At 7.8 g/ml, that shell 130 has a volume of 67 cubic micrometers. The total volume 523 cubic micrometers and the shell volume 67 cubic micrometers yields the hollow volume of 456 cubic micrometers. A sphere of that volume has a radius of 4.77 micrometers, so the wall is 0.23 micrometers, or about 5% of the radius. It is worth noting that these calculations do not account for the mass of the PCM and could be adjusted to account for the mass of the PCM. Such a microparticle can eminently manufactured and can balance the density of the bulk material precisely.

Figure 8:
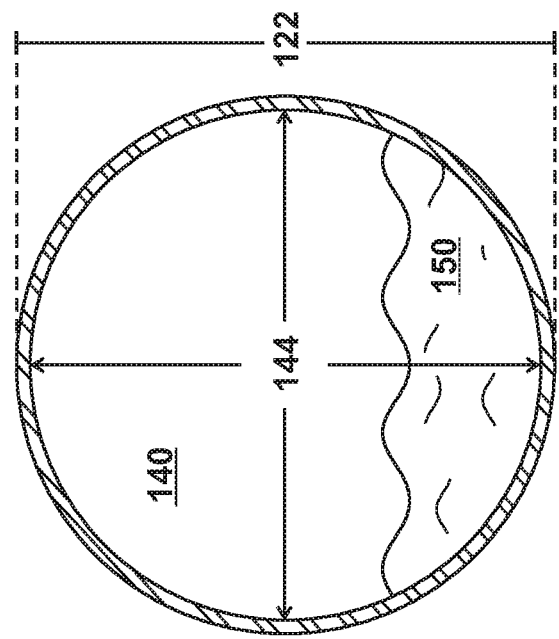
Figure 10:
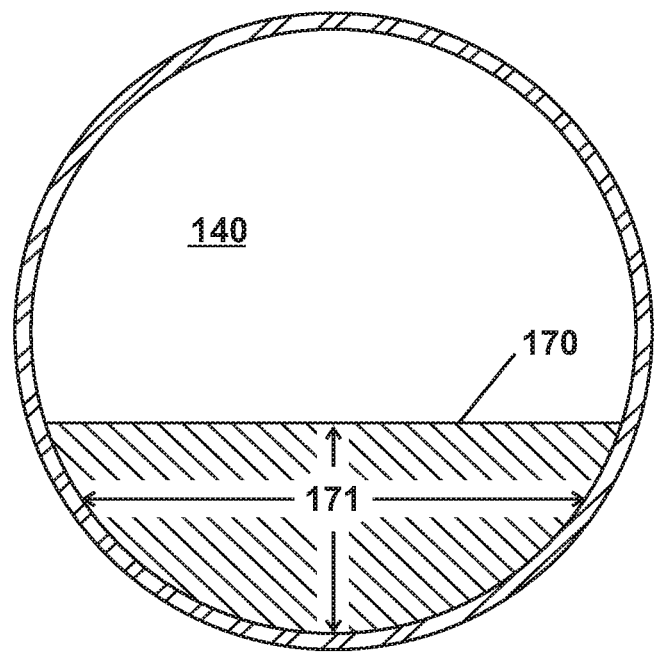

FIGS. 3-5 and 7-10 show the cavity 140 containing a PCM 150,160,170 of various embodiments. In various embodiments as shown in FIGS. 8-10, the PCM as a liquid 150 or as a solid 170 has volumes 151,171 that are less than a volume of the PCM as a gas 160. The PCM 150,160 can include materials such as, for example, water, alcohol, ammonia, Freon, propane, nitrogen, liquid nitrogen, or mixtures thereof.

Further, the PCM 150,160 of various materials include a highly volatile material or a reactive material with a high vapor pressure at standard atmospheric pressure. In various embodiments, the PCM has a vapor pressure at least similar to and/or greater than the vapor pressure of water at any temperature such as, for example, about 0.03169 Bar at about 25° C. (77° F.). In one embodiment, the vapor pressure of the PCM is about 0.03169 Bar at about 25° C. (77° F.).

Figure 13:
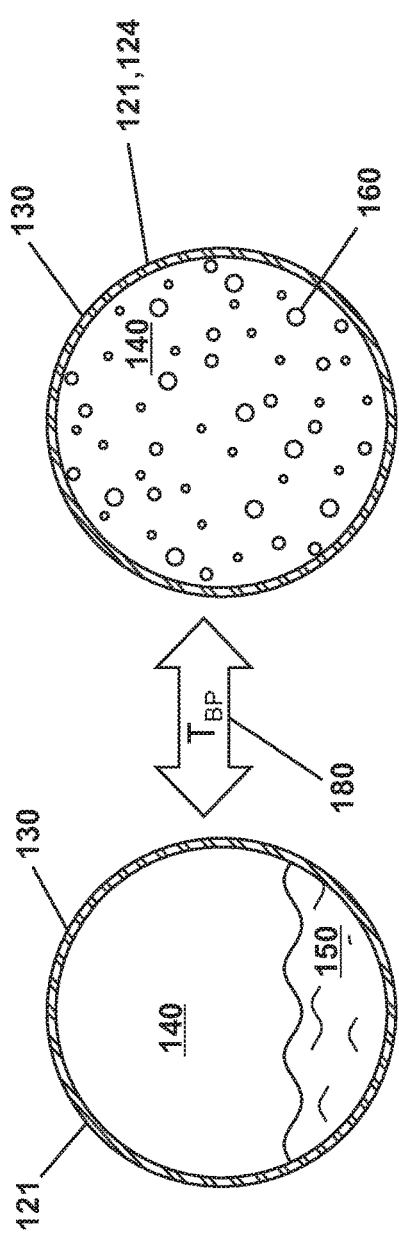
FIG. 13 is a schematic view showing a phase change material in a microparticle of various embodiments transitioning between liquid and gas phases.

As shown in FIG. 13, the PCM 150,160 of various embodiments has a boiling point temperature or gas/liquid transition temperature ($T_{BP2}$) or a $T_{BP2}$ at $P_{Internal}$ 180. The PCM of various embodiments is a gas or in a gaseous phase 160 at or greater than $T_{BP2}$ or $T_{BP2}$ at $P_{Internal}$ 180 and a liquid or in a liquid phase 150 at less than $T_{BP2}$ or $T_{BP2}$ at $P_{Internal}$ 180. In various embodiments, $T_{BP2}$ or $T_{BP2}$ at $P_{Internal}$ 180 is predetermined for an intended use such as, for example, a heat transfer system with parameters (i.e. temperatures, pressures, etc.) that correlate with $T_{BP2}$ or $T_{BP2}$ at $P_{Internal}$ 180.

In various embodiments, $T_{BP1}$ or $T_{BP1}$ at $P_{Outside}$ of the bulk material 110 is greater than $T_{BP2}$ or $T_{BP2}$ at $P_{Internal}$ 180 of the PCM 150,160. For example, a microparticle 120 could be created to have a phase change at 150° C. If the bulk material 110 boils at 170° C., the bulk material 110 would be able to absorb energy at 150° C. efficiently, but still be readily pumped, and still do heat transfers well at 150° C. In another example, a microparticle 120 could be created to have a phase change at 15° C. for differing processes. Further, the limit on transferring heat is the degree of fill of the fluid with the spheres.

As previously highlighted, water at atmospheric pressure (1.01325 Bar) boils at 100° C. The $P_{Internal}$ 141,142 of various embodiments can be, for example, 0.5 Bar, 2 Bar, or 10 Bar and water as a PCM 150,160 in the cavity 140 would have a $T_{BP2}$ 180 of 70° C., 120° C., or 170° C. Thus, the microparticles 120 can be formulated to have a $T_{BP2}$ or $T_{BP2}$ at $P_{Internal}$ of any temperature. For other materials such as alcohol, the difference in $T_{BP2}$ relative to $P_{internal}$ is much greater. In one example for the case of 0.5 Bar and the PCM is water, one could get a heat of fusion for a 70° C. phase change within the microparticles and still pump the microparticles in the bulk material still as a liquid. Since the mass of the microparticles of the particle with the PCM essentially remains constant and the volume only changes by the amount of strain on the shell caused by the change in pressure, the microparticles does not tend to 'boil to the top' of the container.

Figure 14:
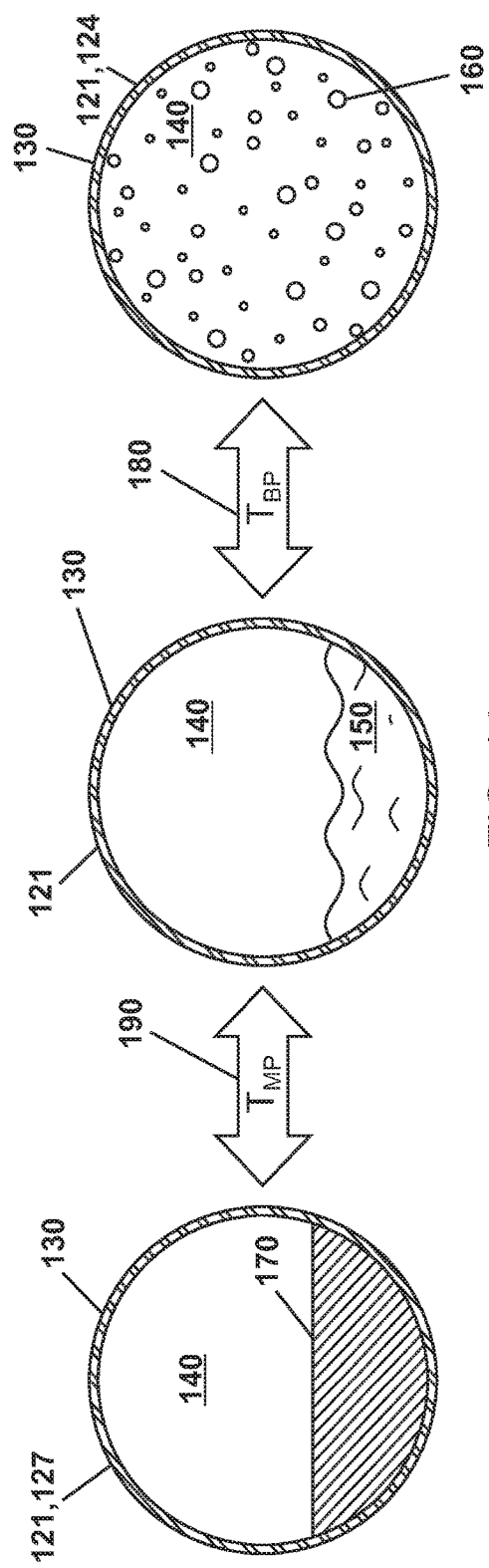
FIG. 14 is a schematic view showing a phase change material in a microparticle of various embodiments transitioning between solid, liquid, and gas phases.

In other embodiments as shown in FIG. 14, the PCM 170 has a melting point temperature ($T_{MP2}$) or $T_{MP2}$ at $P_{Internal}$ 190. The PCM can be a solid 170 below $T_{MP2}$ or $T_{MP2}$ at $P_{Internal}$ 190 and a liquid at or above $T_{MP2}$ or $T_{MP2}$ at $P_{Internal}$ 190.

In various embodiments, $T_{MP1}$ or $T_{MP1}$ at $P_{Outside}$ of the bulk material 110 is less than $T_{MP2}$ or $T_{MP2}$ at $P_{Internal}$ 180.

Figure 4:
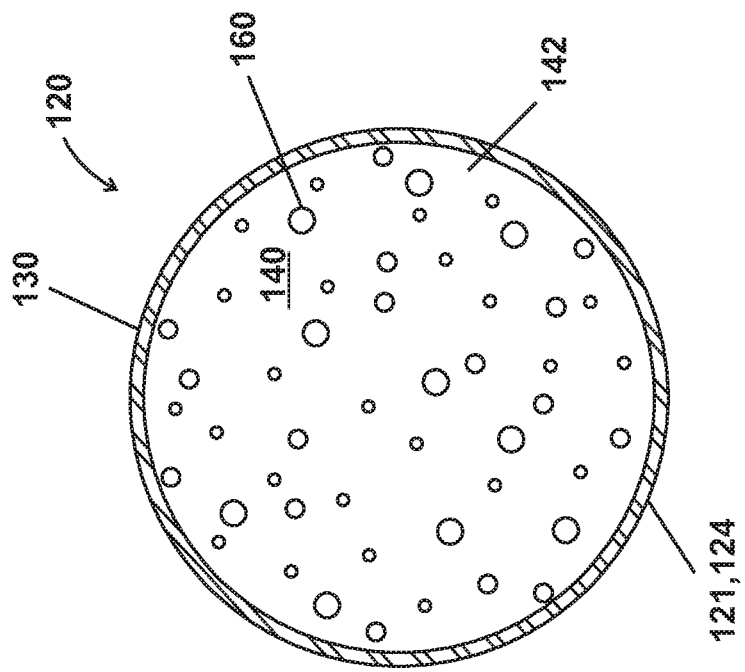
FIGS. 4 and 9 are schematic, cross-sectional views of microparticles of various embodiments containing a phase change material in a gas phase.
Figure 3:
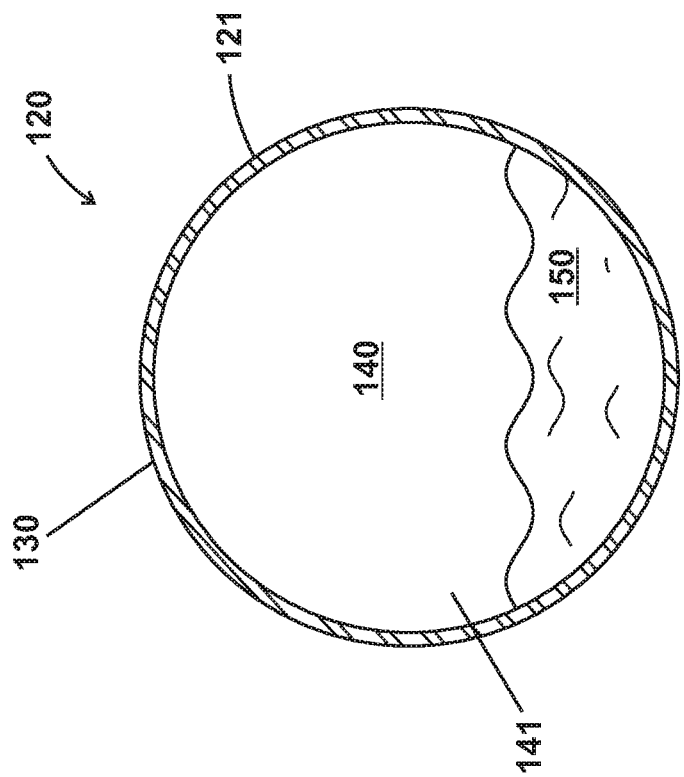
FIGS. 3, 7, and 8 are schematic, cross-sectional views of microparticles of various embodiments containing a phase change material in a liquid phase.
Figure 5:
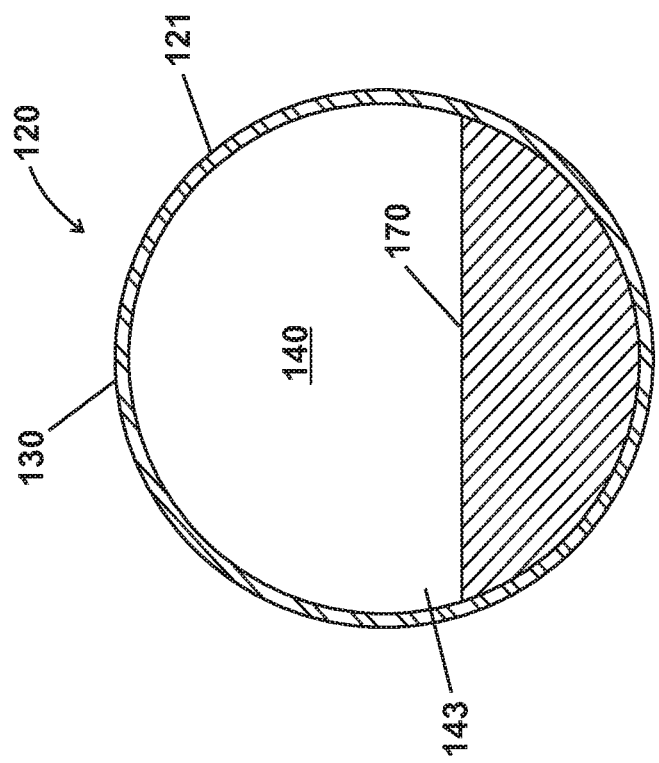
FIGS. 5 and 10 are schematic, cross-sectional views of microparticles of various embodiments containing a phase change material in a solid phase.

As shown in FIGS. 3-5, the cavity 140 of various embodiments can have as first $P_{Internal}$ 141 when the PCM is a liquid 150, a second $P_{Internal}$ 142 when the PCM is a gas 160, and a third $P_{Internal}$ 143 when the PCM is a solid 170. In various embodiments, the second $P_{Internal}$ 142 when the PCM is a gas 160 is greater than the first $P_{Internal}$ 141 when the PCM is a liquid 150 and the third $P_{Internal}$ 143 when the PCM is a solid 170.

In various embodiments as shown in FIGS. 7 and 9, the increase in $P_{Internal}$ 142 when the PCM is a gas 160 can expand the $V_{Cavity}$ of the cavity 140 such that the $V_{Cavity}$ 145 when the PCM is a gas 160 is greater than the $V_{Cavity}$ 144 when the PCM is a liquid 150. For example, the level of increase in $V_{Cavity}$ 145 when the PCM is a gas 160 depends on the material in the shell 130; some polymers may expand more than 1% and steel may expand a few hundredths of a percent.

The $P_{Internal}$ inside the cavity when the PCM 160 is at or above $T_{BP2}$ or $T_{BP2}$ at $P_{Internal}$ can be greater than the $P_{Internal}$ inside the cavity 140 when the PCM 150 is below $T_{BP2}$ or $T_{BP2}$ at $P_{Internal}$. Also in various embodiments, the diameter 123 of the microparticle 120 when the PCM is a gas 160 can be greater than the diameter 122 of the microparticle 120 when the PCM is a liquid 150. Further, the microparticles 120 can have $D_{Gas}$ 124 when the PCM is a gas 160 of various embodiments that are less than $D_{Liquid}$ 121 of the microparticles 120 when the PCM is a liquid 160 of various embodiments.

Since the shell 130 of various embodiments can be relatively thin, the microparticles of various embodiments may expand slightly when the PCM 160 boils and contract back to and recovers when the PCM 150 cools.

Further, the increase of $V_{Cavity}$ 145 when the PCM is a gas 160 causes the shell 130 to expand such that the thickness 131 of the shell 130 when the PCM is a liquid 150 is greater than the thickness 131 of the shell 130 when the PCM is a gas 160 as shown in FIGS. 11 and 13.

Figure 2:
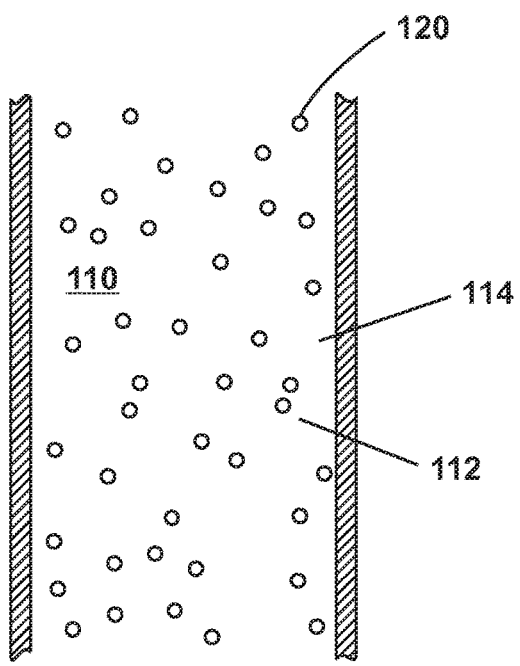
FIG. 2 is a schematic view of a heat transfer medium of various embodiments in a heat transfer system.

FIG. 17 is a schematic depiction showing a heat transfer medium 100,101,102 of various embodiments as shown in FIG. 2 flowing through an example heat transfer system 1000 as disclosed in U.S. Pat. No. 9,109,481, which is incorporated by reference. FIG. 17 illustrates a schematic of a combined engine air flow and engine coolant flow diagram. The coolant flow path is shown as a solid line in which heat transfer medium of various embodiments flows. The air flow path is shown as a dashed line.

Referring now to the coolant flow path for the coolant system 1030, coolant (e.g. heat transfer medium) enters and flows through a thermostat 1055, and then through a water pump 1056. The coolant exits the water pump 1056 and flows through coolant passages in the engine 1016. The coolant system of heat transfer system 1000 can exert $P_{Outside}$ 112 on the coolant.

The coolant may act to cool the engine 1016 if the coolant temperature is lower than the temperature of the engine 1016, where heat from the engine 16 is absorbed by the bulk material 110 and conducted through the shell 130 and into the cavity. At least a portion of the cavities 140 of the microparticles 120 can be heated to a temperature at or above $T_{BP2}$ or $T_{BP2}$ at $P_{Internal}$ 180 such that the PCMs transition from a liquid 150 to a gas 160 as shown in FIG. 13. In other embodiments, at least a portion of the cavities 140 of the microparticles 120 are heated to a temperature at or above $T_{MP2}$ or $T_{MP2}$ at $P_{Internal}$ 190 and $T_{BP2}$ or $T_{BP2}$ at $P_{Internal}$ 180 such that the PCMs transition from solid 170, to a liquid 150, and to a gas 160 as shown in FIG. 14.

Alternatively, the coolant may act to warm the engine 1016 if the coolant temperature is higher than the temperature of the engine 1016, such as may occur during an engine restart in a hybrid vehicle. No coolant flow is provided when the pump 1056 is not operating. In this alternative, heat is conducted from the microparticles 120 and/or bulk material 110 to the engine 16. At least a portion of the cavities 140 of the microparticles 120 can be cooled to a temperature below $T_{BP2}$ or $T_{BP2}$ at $P_{Internal}$ 180 such that the PCMs transition from a gas 160 to a liquid 150 as shown in FIG. 13. In other embodiments, at least a portion of the cavities 140 of the microparticles 120 are cooled to a temperature below $T_{MP2}$ or $T_{MP2}$ at $P_{Internal}$ 190 and $T_{BP2}$ or $T_{BP2}$ at $P_{Internal}$ 180 such that the PCMs transition from a gas 160, to a liquid 150, and to a solid 170 as shown in FIG. 14.

A portion of the coolant in the system 1030 may flow through the exhaust gas recirculation (EGR) valve 1046 to cool the EGR valve 1046. where heat from the engine 1016 is absorbed by the bulk material 110 and conducted through the shell 130 and into the cavity. At least a portion of the cavities 140 of the microparticles 120 can be heated to a temperature at or above $T_{BP2}$ or $T_{BP2}$ at $P_{Internal}$ 180 such that the PCMs transition from a liquid 150 to a gas 160 as shown in FIG. 13. In other embodiments, at least a portion of the cavities 140 of the microparticles 120 are heated to a temperature at or above $T_{MP2}$ or $T_{MP2}$ at $P_{Internal}$ 190 and $T_{BP2}$ or $T_{BP2}$ at $P_{Internal}$ 180 such that the PCMs transition from solid 170, to a liquid 150, and to a gas 160 as shown in FIG. 14. The coolant then flows to a three-way splitter 1060. The splitter 1060 provides a passive control over the coolant flow. In other embodiments, splitter 1060 may be replaced with a valve such that all coolant flow may be selectively directed through a radiator system 1064.

The splitter 1060 is configured to direct the coolant to at least two of three paths. Some coolant flows through a shunt line 1062, where it returns to the inlet to the thermostat 1055.

Coolant flows to a heat exchanger 1066. The heat exchanger 1066 acts as a heater for the HVAC system for the vehicle, and uses warm coolant to heat air for the passenger cabin or compartment of the vehicle. Thus, heat is conducted from the microparticles 120 and/or bulk material 110 to the heat exchanger 1066. At least a portion of the cavities 140 of the microparticles 120 can be cooled to a temperature below $T_{BP2}$ or $T_{BP2}$ at $P_{Internal}$ 180 such that the PCMs transition from a gas 160 to a liquid 150 as shown in FIG. 13. In other embodiments, at least a portion of the cavities 140 of the microparticles 120 are cooled to a temperature below $T_{MP2}$ or $T_{MP2}$ at $P_{Internal}$ 190 and $T_{BP2}$ or $T_{BP2}$ at $P_{Internal}$ 180 such that the PCMs transition from a gas 160, to a liquid 150, and to a solid 170 as shown in FIG. 14. The heated air from the heat exchanger 1066 is used for example in the HVAC system when a user requests a heat setting on the HVAC, for window defrost, etc. The coolant exits the heat exchanger 1066 and flows to the exhaust gas heat exchanger system (EGHX) 1032.

When the thermostat 1055 is open, the coolant flows through a radiator system 1064, which lowers the temperature of the coolant by passing the coolant through a heat exchanger in contact with the environment. The cooled coolant then flows from the radiator system 1064 back to the thermostat 1055. The flow path through the radiator may be used to lower the coolant temperature and in turn lower the engine temperature. Thus, heat is conducted from the microparticles 120 and/or bulk material 110 to the radiator system 1064. At least a portion of the cavities 140 of the microparticles 120 can be cooled to a temperature below $T_{BP2}$ or $T_{BP2}$ at $P_{Internal}$ 180 such that the PCMs transition from a gas 160 to a liquid 150 as shown in FIG. 13. In other embodiments, at least a portion of the cavities 140 of the microparticles 120 are cooled to a temperature below $T_{MP2}$ or $T_{MP2}$ at $P_{Internal}$ 190 and $T_{BP2}$ or $T_{BP2}$ at $P_{Internal}$ 180 such that the PCMs transition from a gas 160, to a liquid 150, and to a solid 170 as shown in FIG. 14. The shunt 62 flow may vary based on whether coolant is also flowing through the radiator system 64.

The coolant enters the EGHX unit 1050 of the EGHX system 1032. Within the EGHX unit 1050, the coolant and the exhaust gas are configured to exchange heat. If exhaust gas is flowing through the EGHX unit 1050, heat may be exchanged between the two mediums such that the coolant temperature is increased by the exhaust gas temperature. After the coolant leaves the EGHX unit 1050, the coolant temperature is measured by a heat exchanger coolant temperature sensor (HECT) 1068, that is either incorporated into the EGHX system 1032, or is positioned in a coolant line downstream of the EGHX system 1032. The coolant then flows back to the inlet of the thermostat 1055.

If heat is exchanged from the exhaust gas to the coolant, at least a portion of the cavities 140 of the microparticles 120 can be heated to a temperature at or above $T_{BP2}$ or $T_{BP2}$ at $P_{Internal}$ 180 such that the PCMs transition from a liquid 150 to a gas 160 as shown in FIG. 13. In other embodiments, at least a portion of the cavities 140 of the microparticles 120 are heated to a temperature at or above $T_{MP2}$ or $T_{MP2}$ at $P_{Internal}$ 190 and $T_{BP2}$ or $T_{BP2}$ at $P_{Internal}$ 180 such that the PCMs transition from solid 170, to a liquid 150, and to a gas 160 as shown in FIG. 14.

Alternatively if heat is exchanged form the coolant to the exhaust gas, at least a portion of the cavities 140 of the microparticles 120 can be cooled to a temperature below $T_{BP2}$ or $T_{BP2}$ at $P_{Internal}$ 180 such that the PCMs transition from a gas 160 to a liquid 150 as shown in FIG. 13. In other embodiments, at least a portion of the cavities 140 of the microparticles 120 are cooled to a temperature below $T_{MP2}$ or $T_{MP2}$ at $P_{Internal}$ 190 and $T_{BP2}$ or $T_{BP2}$ at $P_{Internal}$ 180 such that the PCMs transition from a gas 160, to a liquid 150, and to a solid 170 as shown in FIG. 14.

The various heat exchangers in the vehicle may be any type of heat exchanger including co-flow, counter-flow, cross flow, and the like.

The coolant system 1030 may have a reservoir (not shown) where coolant accumulates when it is not flowing through a cooling line or system connected to the cooling lines, and additionally the coolant system 1030 may have a degas system with reservoir 1070 for removing any air from the system 30.

The coolant flows through the shunt line 1062. The shunt line 1062 allows for more coolant to circulate through engine 1016 than can be accommodated by the heat exchanger 1066 path alone (i.e. when the radiator 1064 path is closed by the thermostat 1055). The coolant flows through the radiator 1064 loop when the coolant temperature is high and lowering the coolant temperature is desired. If the coolant is heated in the radiator 1064 loop, then at least a portion of the cavities 140 of the microparticles 120 can be heated to a temperature at or above $T_{BP2}$ or $T_{BP2}$ at $P_{Internal}$ 180 such that the PCMs transition from a liquid 150 to a gas 160 as shown in FIG. 13. In other embodiments, at least a portion of the cavities 140 of the microparticles 120 are heated to a temperature at or above $T_{MP2}$ or $T_{MP2}$ at $P_{Internal}$ 190 and $T_{BP2}$ or $T_{BP2}$ at $P_{Internal}$ 180 such that the PCMs transition from solid 170, to a liquid 150, and to a gas 160 as shown in FIG. 14. But if the coolant is cooled in the radiator 1064 loop, then at least a portion of the cavities 140 of the microparticles 120 can be cooled to a temperature below $T_{BP2}$ or $T_{BP2}$ at $P_{Internal}$ 180 such that the PCMs transition from a gas 160 to a liquid 150 as shown in FIG. 13. In other embodiments, at least a portion of the cavities 140 of the microparticles 120 are cooled to a temperature below $T_{MP2}$ or $T_{MP2}$ at $P_{Internal}$ 190 and $T_{BP2}$ or $T_{BP2}$ at $P_{Internal}$ 180 such that the PCMs transition from a gas 160, to a liquid 150, and to a solid 170 as shown in FIG. 14.

FIGS. 15A, 15B, 16A, and 16B show heat transfer systems of various embodiments. In various embodiments, surface 200 is positioned at a height below surface 300.

Figure 15A:
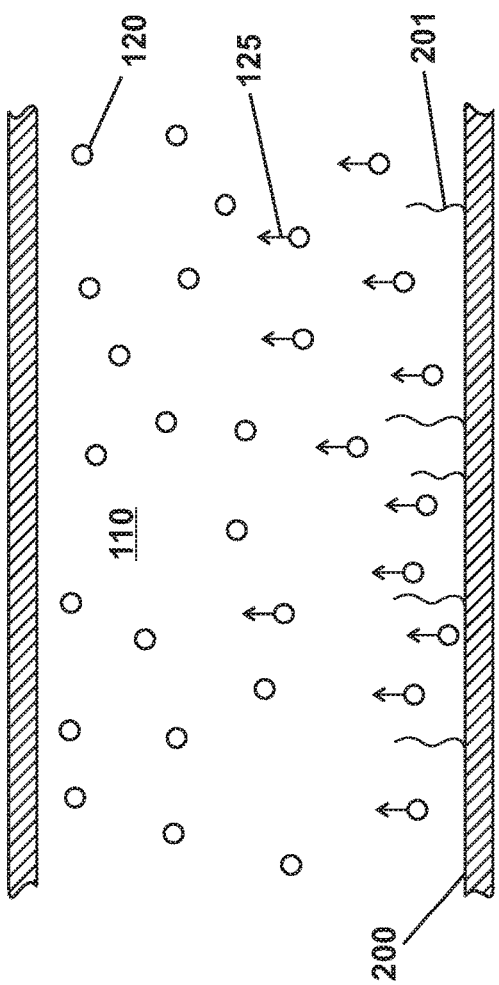
FIGS. 15A and 15B are schematic views showing microparticles of various embodiments rising through the bulk material after heating such that the phase change material transitions from a liquid to a gas.
Figure 15B:
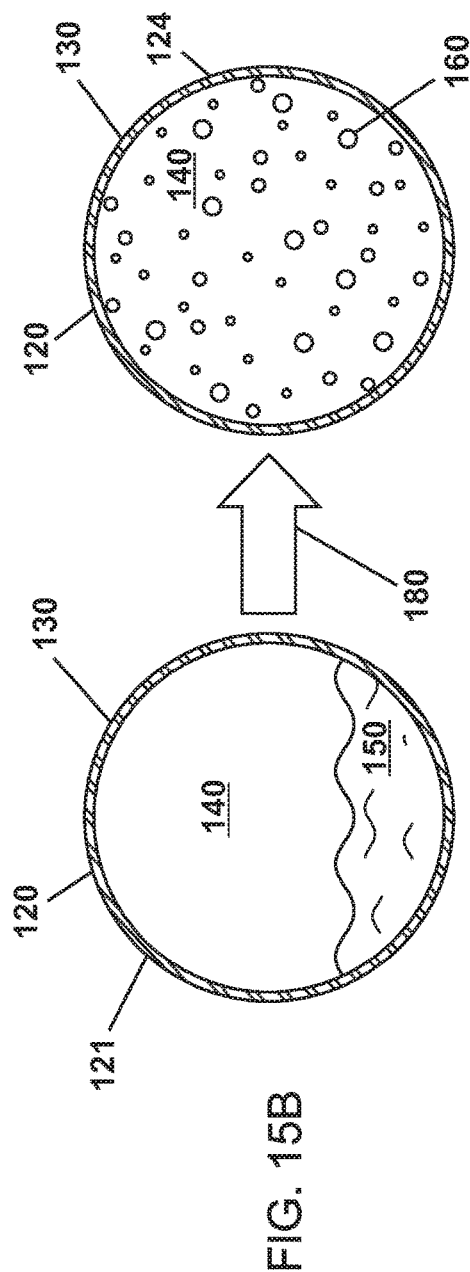

FIG. 15A shows a surface 200 conducting heat 201 to the bulk material 110 and microparticles 120. The bulk material 110 can conduct the heat 201 to the microparticles 120, where the microparticles 120 rise 125 through the bulk material 110 when the cavity 140 is heated to a temperature at or above $T_{BP2}$ or $T_{BP2}$ at $P_{Internal}$ 180 such that PCMs transition from a gas 160 to a liquid 150 as shown in FIG. 15B. The microparticles 120 rise through the bulk material of various embodiments may be due to the $D_{Gas}$ 124 of the microparticles 120 when the PCM is a gas 160 being less than the $D_{Liquid}$ 124 of the microparticles 120 when the PCM is a liquid 150.

Figure 16A:
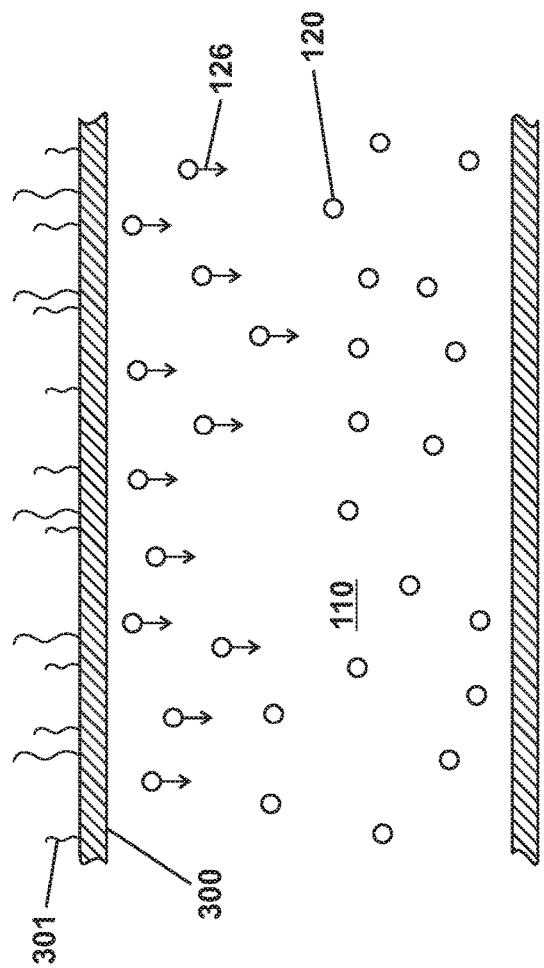
FIGS. 16A and 16B are schematic views showing microparticles of various embodiments rising through the bulk material after cooling such that the phase change material transitions from a gas to a liquid.
Figure 16B:
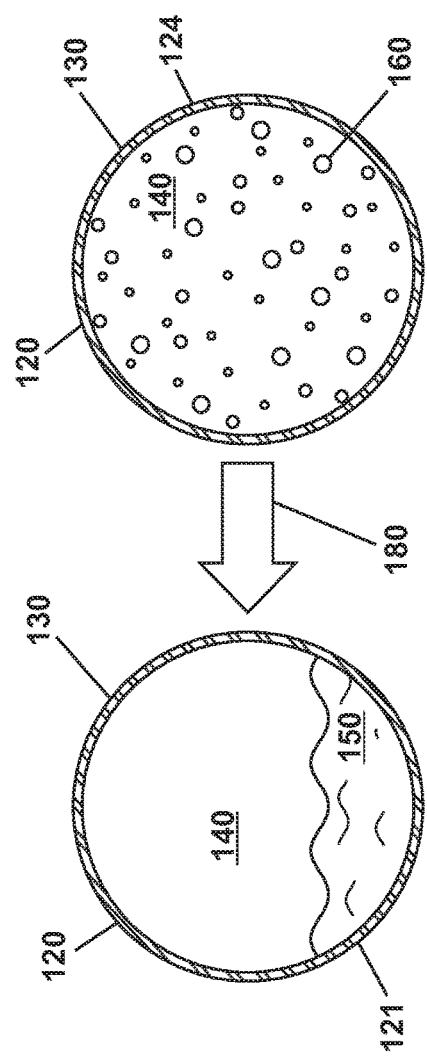

FIG. 16A shows surface 300 conducting heat 301 away the bulk material 110 and microparticles 120. The bulk material 110 can conduct the heat 301 away from the microparticles 120 and to the surface 300, where the microparticles 120 fall 126 through the bulk material 110 when the cavity 140 is cooled to a temperature below $T_{BP2}$ or $T_{BP2}$ at $P_{Internal}$ 180 such that PCMs transition from a liquid 150 to a gas 160 as shown in FIG. 16B.

In various embodiments, the surfaces 200,300 are heat exchangers where surface 200 is positioned at a height below surface 300.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A heat transfer system comprising:
a plurality of microparticles within a bulk material, where each microparticle has a shell enclosing a cavity having a pressure ($P_{Internal}$) independent of pressure outside the shell and including a phase change material having a boiling point temperature ($T_{BP}$) at $P_{Internal}$; and
first ($HE_1$) and second ($HE_2$) heat exchangers thermally connected to the plurality of microparticles;
wherein $HE_1$ is configured to heat the plurality of microparticles to at least $T_{BP}$ at $P_{Internal}$ to cause the microparticles to rise within the bulk material;
wherein $HE_2$ is configured to cool the plurality of microparticles to below $T_{BP}$ at $P_{Internal}$ to cause the microparticles to fall within the bulk material.

2. The heat transfer system of claim 1, wherein the bulk material has a boiling point temperature that is greater than $T_{BP}$.

3. The heat transfer system of claim 1, wherein the microparticles within the bulk material is a non-settling slurry.

4. The heat transfer system of claim 1, wherein the microparticles are at least 0.1 percent by weight of the microparticles within the bulk material.

5. The heat transfer system of claim 1, wherein the cavity has a volume ($V_{Cavity}$) and the phase change material as a liquid is about 0.1 percent to about 50 percent of $V_{Cavity}$.

6. The heat transfer system of claim 1, wherein the shell has a tensile strength or a Young's modulus of at least about 10 MPa (1450.38psi).

7. The heat transfer system of claim 1, wherein the shell has a percent elongation of at least about 0.1.

8. The heat transfer system of claim 1, wherein each microparticle has a density ($D_{Gas}$) when the phase change material is a gas and a density ($D_{Liquid}$) when the phase change material is a liquid and $D_{Liquid}$ is greater than $D_{Gas}$.

9. The heat transfer system of claim 1, wherein the microparticles have a mean diameter ($MD_{Gas}$) when the phase change material is a gas and a mean diameter ($MD_{Liquid}$) when the phase change material is a liquid and $MD_{Gas}$ is greater than $MD_{Liquid}$.

10. The heat transfer system of claim 1, wherein the shell has a volume ($V_{Shell}$), the cavity has a volume ($V_{Cavity}$), and each microparticle have a $V_{Cavity}:V_{Shell}$ ratio ranging from about 3:1 to about 200:1.

11. The heat transfer system of claim 1, wherein the phase change material has a vapor pressure of about at least about 0.03169 Bar at about 25° C. (77° F.).

12. The heat transfer system of claim 1, wherein the cavity has an internal pressure independent of pressure outside the shell.

13. The heat transfer system of claim 12, wherein the internal pressure is different from the pressure outside of the shell.

14. The heat transfer system of claim 1, wherein the bulk material has a melting point temperature ($T_{MP1}$), the phase change material has a melting temperature ($T_{MP2}$), and $T_{MP1}$ is less than $T_{MP2}$.

* * * * *